(12) United States Patent
Hars et al.

(10) Patent No.: US 8,843,767 B2
(45) Date of Patent: *Sep. 23, 2014

(54) SECURE MEMORY TRANSACTION UNIT

(71) Applicant: The Boeing Company, Chicago, IL (US)

(72) Inventors: Laszlo Hars, Lafayette, CO (US); Paul J. Lemmon, Livermore, CA (US); Donald Matthews, Longmont, CO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,871

(22) Filed: Dec. 20, 2012

(65) Prior Publication Data

US 2013/0117577 A1    May 9, 2013

Related U.S. Application Data

(63) Continuation-in-part of application No. 13/341,630, filed on Dec. 30, 2011.

(60) Provisional application No. 61/505,039, filed on Jul. 6, 2011.

(51) Int. Cl.
G06F 11/30 (2006.01)
G06F 21/00 (2013.01)
G06F 12/14 (2006.01)

(52) U.S. Cl.
CPC .................. *G06F 12/1408* (2013.01); *G06F 21/00* (2013.01)
USPC .......................................................... 713/190

(58) Field of Classification Search
USPC .......................................................... 713/190
See application file for complete search history.

(56) References Cited

U.S. PATENT DOCUMENTS

| | | | |
|---|---|---|---|
| 7,093,137 B1 * | 8/2006 | Sato et al. ..................... | 713/193 |
| 7,469,344 B2 * | 12/2008 | Folmsbee ...................... | 713/190 |
| 7,802,108 B1 * | 9/2010 | Master et al. ................. | 713/193 |
| 7,894,599 B2 * | 2/2011 | Rigler ............................. | 380/28 |
| 7,937,595 B1 * | 5/2011 | Kumar et al. ................. | 713/192 |
| 8,370,645 B2 * | 2/2013 | Asnaashari ................... | 713/193 |
| 8,504,849 B2 * | 8/2013 | Jogand-Coulomb et al. . | 713/194 |

* cited by examiner

*Primary Examiner* — Amare F Tabor

(57) ABSTRACT

A method for providing security for plaintext data being transferred between units in a computer system includes steps of dividing a memory into a series of addressable locations, each of the addressable locations having an address at which can be stored version information, a data authentication tag, and ciphertext corresponding to the plaintext. The system retrieves the ciphertext, the version information, and the data authentication tag, and generates encryption keys for decrypting the information stored at the address. If the data authentication tag indicates the plaintext data are valid, then the system provides the decrypted plaintext to the requestor, or encrypts new plaintext data and stores the corresponding ciphertext with new authentication and version information at the first address.

23 Claims, 8 Drawing Sheets

SECURE MEMORY TRANSACTION UNIT

REFERENCE TO RELATED APPLICATION

This patent application is a continuation-in-part of and claims priority to U.S. patent application Ser. No. 13/341,630, filed Dec. 30, 2011, entitled "Infinite Key Memory Transaction Unit;" which application claims priority to U.S. Provisional Application No. 61/505,039, filed Jul. 6, 2011, entitled "Secure Server for Configuring and Programming Secure Microprocessors and Infinite Key Memory Transaction Unit." The contents of both applications are incorporated herein by reference for all purposes.

BACKGROUND OF THE INVENTION

To provide for secure communications and protection of financial, military, medical or other data requiring a high degree of protection, computer and microprocessor-based systems now implement various security measures. These measures are generally intended to preclude an adversary's illicit access to data stored in a memory being accessed by the microprocessor, for example, because the memory and microprocessor are on the same circuit board and/or coupled by a bus. Common types of attacks on such processors can be categorized as active or passive attacks. In passive attacks an adversary reads the contents of the memory, in the hope to discover secrets, like passwords, copyrighted material, etc. A passive attacker can also monitor the data traffic between the processor and the memory (or some peripherals) for secrets. Active attacks attempt to modify the contents of the memory, or the data traffic between the memory and the processor. Active attacks include attempts to copy-and-paste memory blocks between different locations, or playing back earlier content of the same, or another location. Such attacks can cause harm, for example by creating an infinite loop, or otherwise impact the program. In a known data recognition attack, an adversary may attempt to learn an encryption key by watching writes of known data to the same address. Herein we provide a secure approach to protecting microprocessor accesses to a memory.

BRIEF SUMMARY OF THE INVENTION

This invention relates to protection of data in computer systems, and in particular, to the protection of data stored in memories in computer systems, which data are often transferred on buses between units in computer systems. In our preferred implementation, we include a Secure Memory Transaction Unit (SMTU) which is used in all transactions—read or write—to a memory. The SMTU provides, with very high probability, a different encryption key for every memory location. During read transactions, previously encrypted data are retrieved from the memory by the SMTU, decrypted, and authenticated against signs of tampering. If the data are considered valid, the data are returned to the device requesting that data. In write transactions the SMTU reads the data at the target address, then decrypts and authenticates that data just as with a read access. Once this is complete, the data to be written are merged with the data read from the location, encrypted, and then written back to the memory. In case a whole block of data is to be written, that is the merge operation becomes a replacement, the initial read operation can be omitted, trading security for speed.

In a preferred embodiment, our method for providing security for read data being transferred between, or within, units in a computer system includes the steps of dividing the memory into a series of addressable locations, each having an address and each storing encrypted data, version information and an authentication value. A unique encryption key and a different, unique authentication key is used for each address. These keys are unpredictable to an adversary, and kept secret before, during and after they are used. In each memory access, the encrypted data, version information, and an authentication value are retrieved. The data are decrypted with a key corresponding to the memory address and the version information, and the authentication value is checked to determine if the data are valid. The version information is preferably derived from a global write counter, telling how many encrypted write operations have taken place in the current computing session, but there are other possibilities, including using the number of all write operations, a time stamp, etc.

In write operations, when preceding data read is performed and the data read from the location are verified by the SMTU as valid, new data are written to the address from which the data were retrieved using a new encryption key. The new key is preferably based on the address, the number of memory writes made and a secret random number. In a preferred embodiment, the authentication value depends on the data, and also depends on the address and the number of writes made during the current session of operation. This dependency is cryptographically secure, that is, an adversary cannot create a valid authentication value of data, and cannot deduce any information from the authentication value about the corresponding data.

Our system provides substantially higher security for data in microprocessor-based systems in which the data, for example financial, medical, or military, require high security and the prevention of access other than to authorized users.

DETAILED DESCRIPTION OF THE INVENTION

Figure 1:
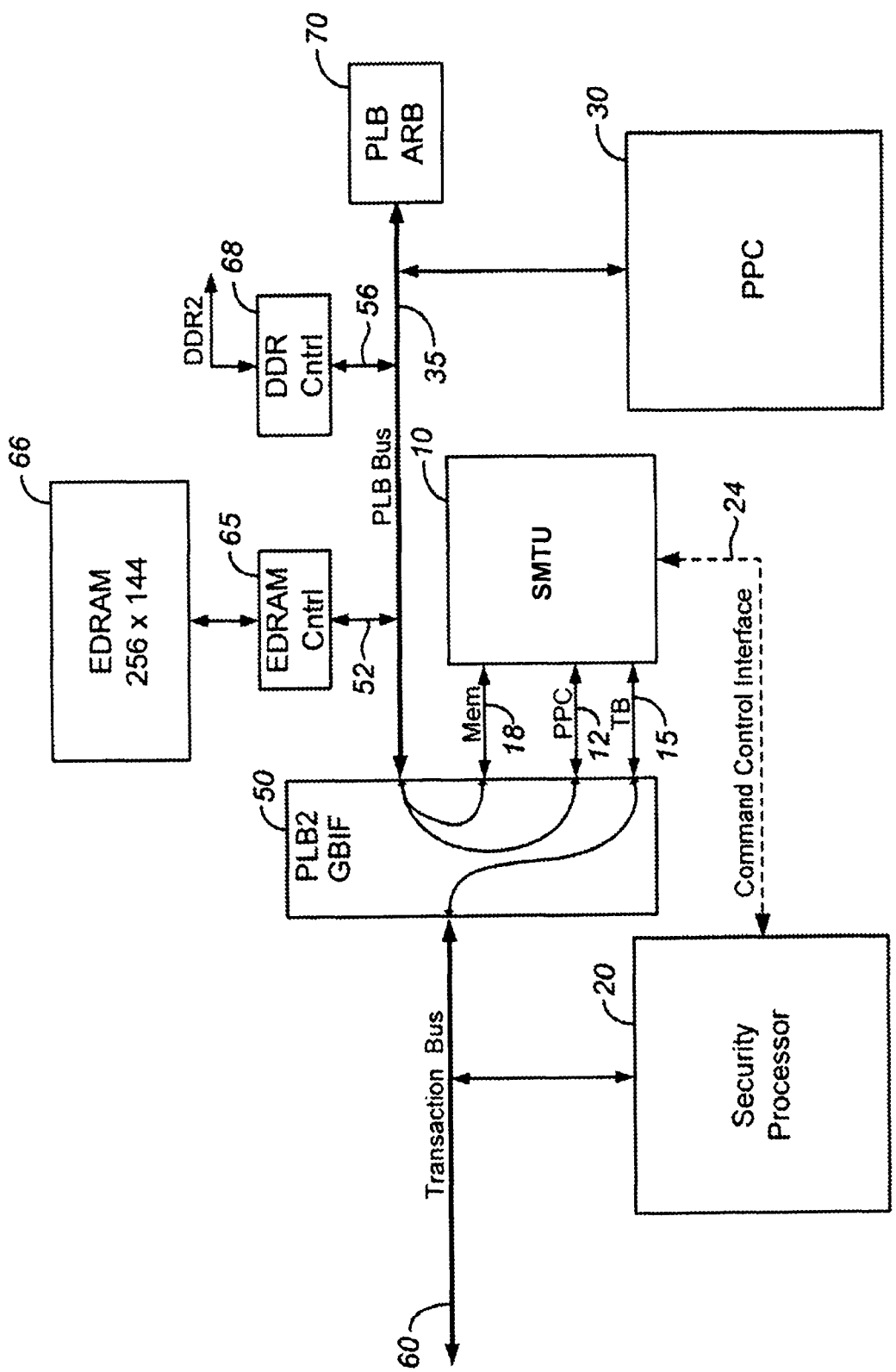
FIG. 1 is a block diagram of a system which includes an SMTU unit.

We have developed a system for encryption of data being communicated over a bus between one or more memories and one or more processors, typically between a microprocessor and dynamic random access memory coupled to that microprocessor. We refer to the system as a secure memory transaction unit. A different, secret, uncorrelated encryption key is used for every memory location and for every write, so even a later write to an address earlier written will have a different key. The version information affects the encryption, and thus "hides" even rewriting of the same data to a given address. Thus, the data for every transaction between the microprocessor and the memory is encrypted differently for each transaction and for each address. This provides a high level of security and enhances protection of the data stored in memory.

For assurance of high security data there are two main concerns—the ciphers used and the key material for those ciphers. In our preferred embodiment we use standard encryption algorithms as ciphers. These algorithms have undergone many man-years of analysis as to the strength of the underlying algorithms. With regard to key material, most security failures in commercial computer applications occur, not due to the cryptography, but as a result of how the key is generated. To enhance security we provide special techniques for how keys are generated, and how the values used to generate the key are used.

A further goal of our secure memory transaction unit is information assurance. Information assurance addresses "how much information is lost during a breach." To enhance information assurance we use an "infinite key" approach, which, with very high probability, causes the data stored at each memory location to be encrypted with a different encryption key. Thus, if an adversary is able to break the key for a particular memory location and gain that information, all other memory locations still contain information that the adversary cannot learn with that key. Our "infinite key" is based on the address of the stored data, but we further diversify the infinite key by including version information in generation of the key. Therefore, not only does the key change based on the memory address, but it also changes with each write operation. The version information is derived from a diversified write counter value, by multiplying the write counter by a large number. This can be implemented as incrementing a write counter register by a large number, instead of 1, and let this value wrap around when it exceeds the largest value the register can represent. To maximize the length of the cycle resulting from the fixed range of the counter, this number is preferably odd.

A further goal of our secure memory transaction unit (SMTU) is to provide anti-tampering measures. Anti-tampering concerns "how much effort is required to break all the security." We address this in the secure memory transaction unit by generating keys using many bits of changeable information. The amount of changeable information is implemented by using large hidden memories for storage of key material, as well as other means described below.

The SMTU uses the Advanced Encryption Standard (AES) algorithm in two modes with different keys for encryption and authentication of the external memory content. In the preferred embodiment, each 16 bytes of data are encrypted with a statistically unique encryption key and tagged with a 10 byte authentication value that is stored in memory alongside the encrypted data. Each encryption key is based on the requested address, a Global Write Counter (GWC) value, a huge secret random number, and a code representing an operational security mode.

In the preferred implementation, the Global Write Counter (GWC) is a 48-bit value, that is also one factor in generating the encryption key and the authentication key. It is reset at the beginning of every session of secure operation. The global write counter values can be stored in-the-clear or encrypted with the user data, and modified by a secret mask value before use as part of the key generation. The GWC value is incremented, before any write operation, by a 48-bit value in a GWC increment value register. This increment value is a large odd value that does not have many consecutive 1's or 0's in its binary representation. Examples of typical values that satisfy this requirement are segments of the bit sequences of $\pi$, e, $\sqrt{2}$, $\sqrt{3}$, the golden ratio, etc. Use of values such as these assures that consecutive GWC values differ in about half the bits, in the average. Use of an odd GWC increment value assures that the GWC will not wrap around in typical applications for more than 10 years of continuous operation.

The encryption keys are also based upon a high quality 16K bit secret random number. The storage of the random number is hidden, internal to the SMTU, but the generation of the random number is preferably external to the SMTU, although on the same integrated circuit. The random number can either be unique for the duration of a single session, or it can be persistent for decrypting encrypted data previously saved in an external nonvolatile storage.

Our use of a global write counter provides a countermeasure against the "known data" attack, during which an adversary attempts to learn an encryption key by watching writes of predicted data to the same address. The global write counter, and the masking of it, assure that each write to a given memory location is encrypted unpredictably and uniquely (with a very high degree of certainty).

The SMTU can be programmed to remap any logical 64-bit request address to point to internal or external memory, and to protect various areas of a 64-bit address space. The key generation and mapping is typically based on a 32-bit address, or 4 GB of addressable memory. The SMTU uses a concept of a memory window and in the exemplary implementation it can manage two different windows with completely independent encryption policies and security options. In the preferred embodiment, the size of each window is 2 GB. Of course the windows can be of any size that the total memory allows, and are a multiple of 16 bytes.

During a read transaction, previously encrypted data are read from the memory. The encrypted data, referred to as ciphertext herein, are decrypted. The accessed data is authenticated against signs of data tampering. Only then is the data provided to the requesting device, e.g. the processor. During a write transaction, the encrypted data at the target address of the write are read, decrypted, and authenticated against signs of data tampering, just as with a read transaction. If desired, a different approach can be used when a complete cipher block is to be written. Once this is complete, the data to be written are merged with the data read from the memory. As used here, merged means to replace the portion of the read back data which has changed. The merged data are encrypted, after the version information is updated, that is the write counter is incremented, and a new authentication tag is computed. The write counter value, the authentication tag and the ciphertext is then written back to the memory as a value at the target address. In the exemplary embodiment not all write transactions are implemented as read-modify-write, only those where the data does not fill all of the cipher block. Thus when the requester is writing an entire 128-bit word (the block length of the employed AES cipher), the data at the destination address are not read and authenticated. After the potential data authentication, the new data written to the target address.

If a data authentication error occurs, it indicates that a random error or possible data tampering has occurred. In this case a programmable response is provided by our system. For example, the system can (i) stop processing all read and write requests, (ii) delete the random number used for encryption in the current session, (iii) flush all registers that participated in key generation activities, (iv) trigger a memory flush to overwrite the content of the memory windows with all zeros, or (v) take other action. Another alternative is to increment a fault counter. In this approach, if a threshold of the number of authentication errors is reached, some or all of the above listed actions can take place. This approach is useful in a noisy environment, where random memory read errors occasionally occur. The choice of the action taken depends upon previously configured security policies, for example, as specified by the user of the system.

As stated, we use the phrase "secure memory transaction unit" to describe the unit which performs the functions described above. FIG. 1 is a block diagram of an exemplary system which includes a microprocessor core and illustrates the context in which the Secure Memory Transaction Unit (SMTU) 10 of this invention resides. The SMTU 10 encrypts and decrypts data transfers between the microprocessor core 30 and memory coupled to interface 68 to provide a high level of security for these transactions. In our preferred embodiment microprocessor core 30 is a PowerPC core commercially available from IBM Corporation. The SMTU design is memory agnostic. The type of memory and the location of that memory (internal or external) is not "known" by the SMTU engine. It can also perform transactions to memory 66, and from transaction bus 60 through PLB2GBIF 50 to either memory.

In FIG. 1 the SMTU 10 has three bidirectional external data interfaces and one bidirectional command and control interface. One of the data interfaces PPC 12 is coupled to the microprocessor core 30 via PLB bus 35 to receive control information, e.g. requests to read data from, and write data to, the memory. The PLB bus is a part of a microprocessor bus architecture developed by IBM Corporation for system-on-a-chip technology. Another of the data interfaces TB 15 is coupled to the transaction bus 60, while the third data interface Mem 18 is coupled to the memory via a PLB bus 35. Command and control information is provided to the SMTU 10 from the security processor 20 over a separate command interface 24. All three data interfaces of the SMTU 10 connect to the PLB2GBIF Bridge 50. The PLB2GBIF Bridge allows transactions over the PowerPC core 30 and the memory interfaces 52 and 56 to be routed only to and from the PLB Bus, and the transactions over the transaction bus interface to be routed only to and from the transaction bus 60.

All three interfaces 12, 15, and 18 conform to a bus specification, consisting of Header (TH), Address, (TA), and Data (TD) buses, and the two Request-Response (TX-TR) control pins. Typical signals on these buses are described below. The Power PC interface and the memory interface each have 48-bit headers, allow 64-bit addresses and 128 bits of data. The transaction bus interface also provides 64-bit addressing, but with a 32-bit header and 64 bits of data.

The format of the header word is essentially arbitrary, but provides for parity bits, selection of CPUs, identification of whether data is to be read and returned or written, selection of I/O spaces, and identification of the initiating device, etc. The format of the SMTU command control interface signal is also essentially arbitrary, but it receives input signals identifying the CPU making the request, bits to designate a flush of key material, indications that a command is being received together with the op code information, read address and data. Output signals include transmission of the data read, a busy signal, command information such as indication of tampering, failure of authentication, indication of a memory flush, and error signals.

Configuration and reading of the content of all registers inside the SMTU is performed via the control bus 24, a five signal interface that consists of a request signal, 16-bit command/address bus, 64-bit data in bus, 64-bit data out bus, and a busy status signal. The op codes provide for functionality to write key material; read key material; provide various instructions to the SMTU (such as run, halt, read, write, status, error, mode, window size), and to the memory (load, flush, set to zero, read, write). The SMTU will perform the requested operation.

The SMTU itself provides the encryption and authentication engine. Its purpose is to provide encryption services with tamper detection mechanisms to the on-chip and off-chip storage. For example, it communicates with the embedded dynamic random access memory, eDRAM 66 via its interface 52 or the double data rate synchronous (or other) dynamic random access memory (DDR DRAM) (not shown) through its interface 68. An arbitration circuit 70 allocates use of the PLB bus 35 among the contenders for its use.

The SMTU acts as a slave unit serving read and write requests initiated by the PowerPC 30 or by units coupled to the Transaction Bus 60. Devices requesting data are collectively referred to as the "Requestor" herein. The SMTU then initiates the read or write as requested from the memory address.

As will be explained in more detail below, the SMTU uses a combination of standard operation modes of the Advanced Encryption Standard (AES) cipher for encryption and authentication of the contents of the external memory. Each 16 bytes of data are encrypted with a unique encryption key and tagged with a 16-byte authentication and version information value that is stored in the DRAM (or other) memory with the encrypted data. The encryption keys preferably are based on at least the requested address, the version information, and a secret random number. As will be described below, other values, e.g. a security mode value, can be incorporated to further diversify the encryption.

The use of the SMTU can be further controlled by mode of operation. In the preferred embodiment there are two registers that control the SMTU mode of operation. These are the global mode register and the window mode register. The global mode register specifies the AES key size (usually 256 bits), where to get key material (usually the key material store), if the key material store (KMS) should be flushed if a tamper event is detected, the source of the upper bits of the address for accessing the memory, as well as other variables. In the exemplary implementation a security mode is specified by a 4-bit value between 0 and 15, although additional modes can be specified using additional bits. Also in the preferred embodiment, the SMTU uses the mode bits as part of the key generation.

The SMTU security mode storage can be loaded with a random value when initialized. In some implementations of our technology multiple SMTUs may be in use at the same time by the same client at the same location. If multiple SMTUs are in use, each will have a different security mode value to assure that the keys will be different in each of the multiple SMTUs. In addition a single SMTU accessing multiple memory blocks will have a different security mode value for each memory block, thereby assuring different encryption even if the same memory address is accessed in a different memory block. Memory block access is controlled by a 4-bit mask field that specifies which requestor is allowed access to which memory window.

Figure 2:
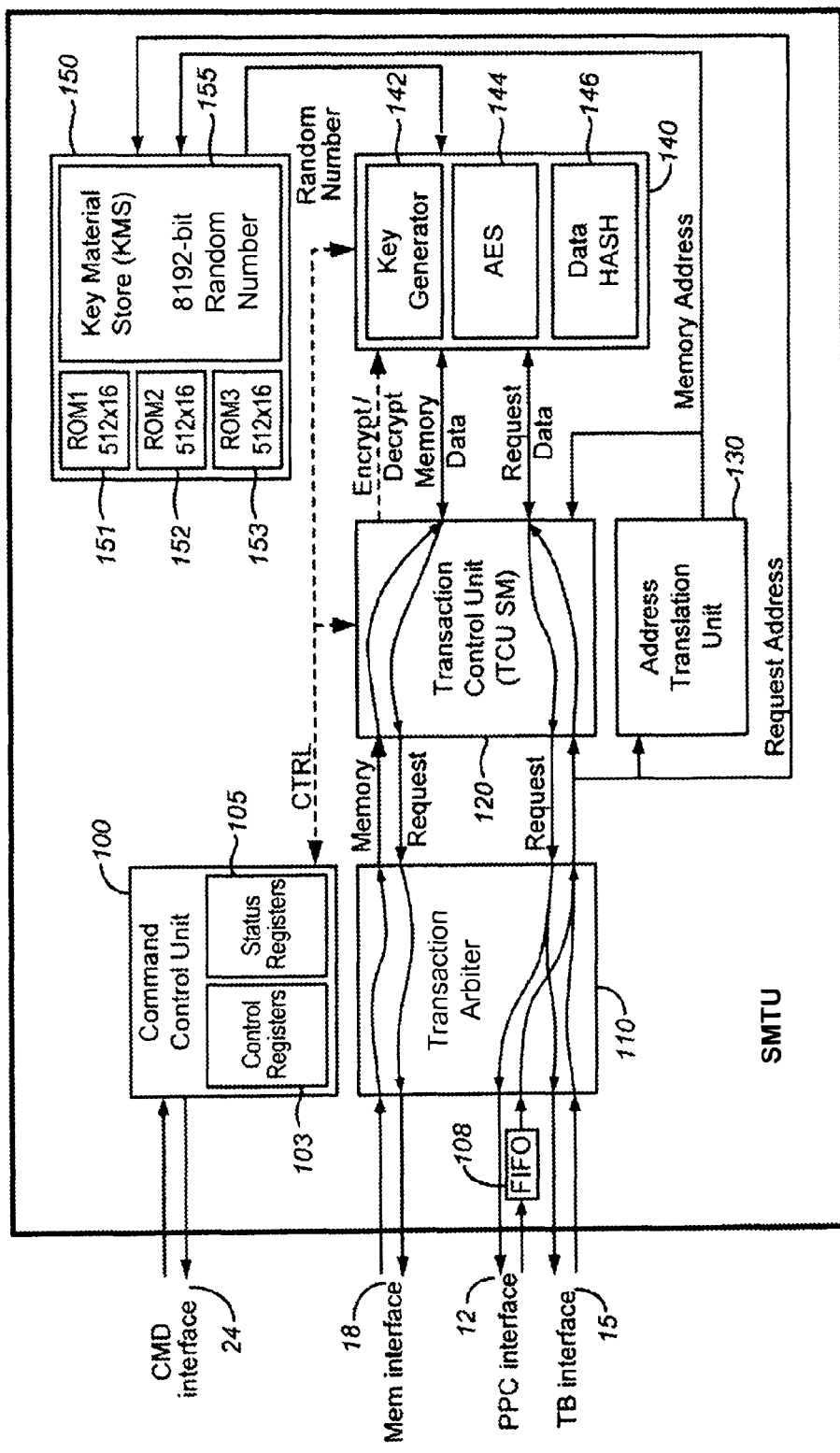
FIG. 2 is a block diagram of the SMTU unit.

FIG. 2 is a diagram illustrating the SMTU 10 in functional block diagram form. SMTU 10 includes a command control unit 100 having control registers 103 and status registers 105. The command control unit 100 is coupled to the command interface 24. A transaction arbiter 110 is coupled to the memory interface 18, the PowerPC interface 12, and the transaction bus interface 15. A first-in first-out (FIFO) memory 108 on the PowerPC interface 12 buffers transactions to the arbiter 110. The arbiter 110 is coupled to a transaction control unit 120 and to an address translation unit 130.

Unit 140 provides key generation 142, AES encryption 144, and data hashing 146. It is coupled to the transaction control unit 120. The key material store (KMS) unit 150 contains three read-only memory blocks (ROMs) 151, 152 and 153 and a set of 16K-bit random numbers 155. Key store unit 150 is connected to unit 140. In response to reads or writes invoking the SMTU, random numbers are provided from the key material store unit 152 to the key generator 142 to encrypt and decrypt data for all transactions with the external memory.

Because the SMTU 10 relies on random numbers stored in the key material store 150, the use of high quality random numbers is desirable. In a preferred embodiment, each SMTU has four 64×64 register arrays within KMS 150 that provide 16K-bit random numbers. Prior to operation, the KMS memory is initialized with 16K-bit random numbers typically generated outside of the SMTU. As an alternative to using a true random number, the KMS can be initialized from the onboard configuration/entropy ROM which contains a random number generated during the system design.

Using the configuration ROMs 151, 152, and 153 as the source of the random numbers, however, makes the generated keys less random, therefore degrading the strength of the anti-tampering mechanism. There are applications, however, in which using the ROMs as the random number sources is preferred to using a true random number. One application is of a time critical application, in which long initialization delays that are associated with generation of the random number are not acceptable. Another type is an application that needs to generate an encrypted data image that can be restored following a system reset or an image that can be restored on a different system.

Figure 3:
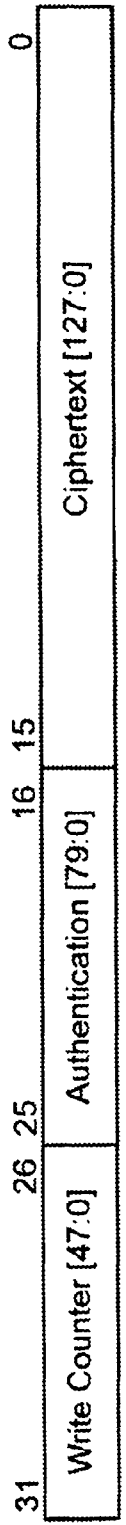
FIG. 3 illustrates the data structure of information stored in a memory.

FIG. 3 illustrates the data structure for encrypted data stored in memory. Encrypted data preferably are stored using 32-byte blocks. Each 32-byte block consists of 16 bytes of encrypted payload (ciphertext) and 16 bytes of security data. The security data includes 6 bytes of version information (write counter value) and 10 bytes of authentication tag.

The 6-byte write counter is a field that is incremented every time external memory is written, regardless of the address. As a result, the incremented value is unique to each address. The encryption operation and the authentication key are derived from target address, the write counter value, and from a random number. Of course, more or fewer fields may be used in the encryption. Because every 16 bytes of encrypted data require an additional 16 bytes for authentication tag and write counter value, the effective data storage capacity of each window is one-half its physical size. Of course larger or smaller memories and different data and tag sizes could be implemented.

The encryption key used in the SMTU is based on a flow of data in a series of electronic circuits. We refer to this series of circuits as "accumulators," and use them to generate various values. Accumulators 1, 2, 3, and 4 are used for key generation, while Accumulator 5 controls the logic for Accumulators 1-4. Accumulators 1 and 2 are used to generate keys to encrypt data in the case of a write, and to decrypt the encrypted data in the case of a read. Accumulators 3 and 4 generate keys for data authentication tags at write which are then later used to verify the integrity of the data at read. The data authentication tags serve as a message authentication code, a short piece of information used to authenticate a message and to detect message tampering and forgery. The tag protects both the data's integrity as well as its authenticity, by allowing detection of any changes to the message content. In one embodiment the tags are implemented by a block cipher, that is an algorithm which operates on a block of bits, to perform a transformation specified by a key.

The design of the SMTU provides assurance that all keys generated are a mix of data from multiple blocks of KMS memories storing random numbers. This ensures that a key or portion of a key will not "leak" information from a single memory block. Additionally, it ensures that the keys have a large amount of randomness in them.

Figure 4:
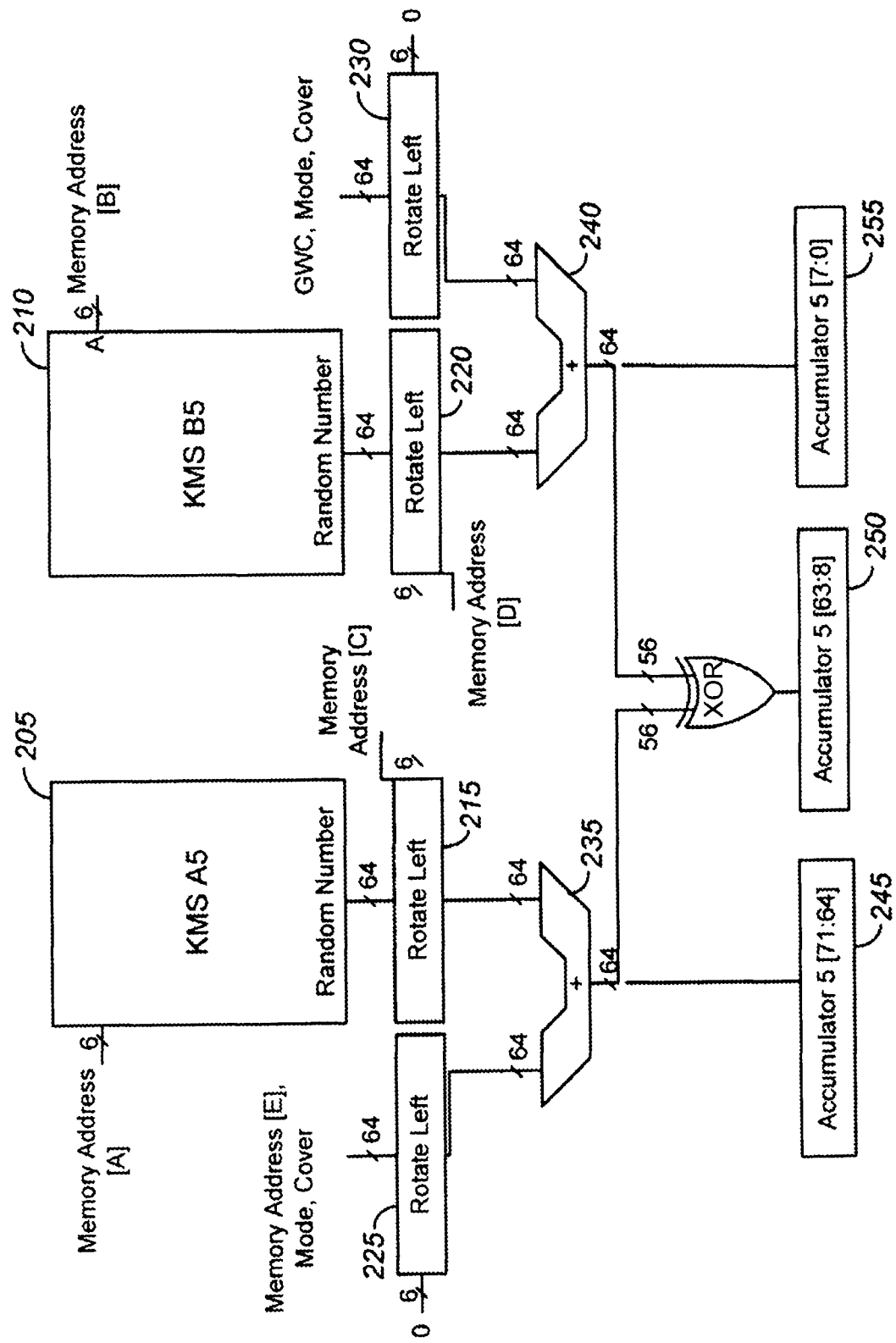
FIG. 4 is a block diagram of Accumulator 5.

Accumulator 5 is discussed first. FIG. 4 is a block diagram illustrating the logic used in computation of the value from Accumulator 5. At the time of boot up of the computer system, random numbers are generated (or provided) and stored in key material store memories KMS A5 205 and KMS B5 210, and also in additional memories KMS A and KMS B, discussed later below. A subset of 6 address bits [A] from the target address for the read or write operation are provided to the memory KMS A5 205, while six other address bits [B] from the target address are provided to the KMS B5 210. In response KMS memories 205 and 210 each provide a 64-bit random number to corresponding registers 215 and 220. Another subset of address bits [C] from the target memory address are used to rotate the random number in register 215, while a further subset of the memory address bits [D] are used to rotate the random number in register 220.

Other bits [E] from the memory address are loaded into register 225. Also loaded into register 225 are security mode bits resulting from the security mode chosen by the user, and mask bits. The mask bits come from a special register for this purpose. Correspondingly, global write counter bits, security mode bits, and mask bits are loaded into register 230. Registers 215 and 225 are coupled to adder 235, while registers 220 and 230 are coupled to adder 240. The results of the additions are combined by an exclusive OR (XOR) operation and bit selection to provide registers 245, 250 and 255 with bits to form the 72-bit value which is the output of Accumulator 5. The XOR block combines information by bitwise XOR operation, making the result less predictable.

The mask bits (also denoted as "cover" bits) are used to alter the base value that is used in the key generation algorithms, in effect masking the value. There are two mask bit values, one for the address and one for the global write counter. Neither of these values can be determined by an adversary. The address has a 1:1 relationship with the memory address in DRAM, and the unmasked GWC is written out as part of the data. By using a mask value, even if the adversary knows the key generation algorithm, it does not have the actual value used in the key generation.

Figure 5:
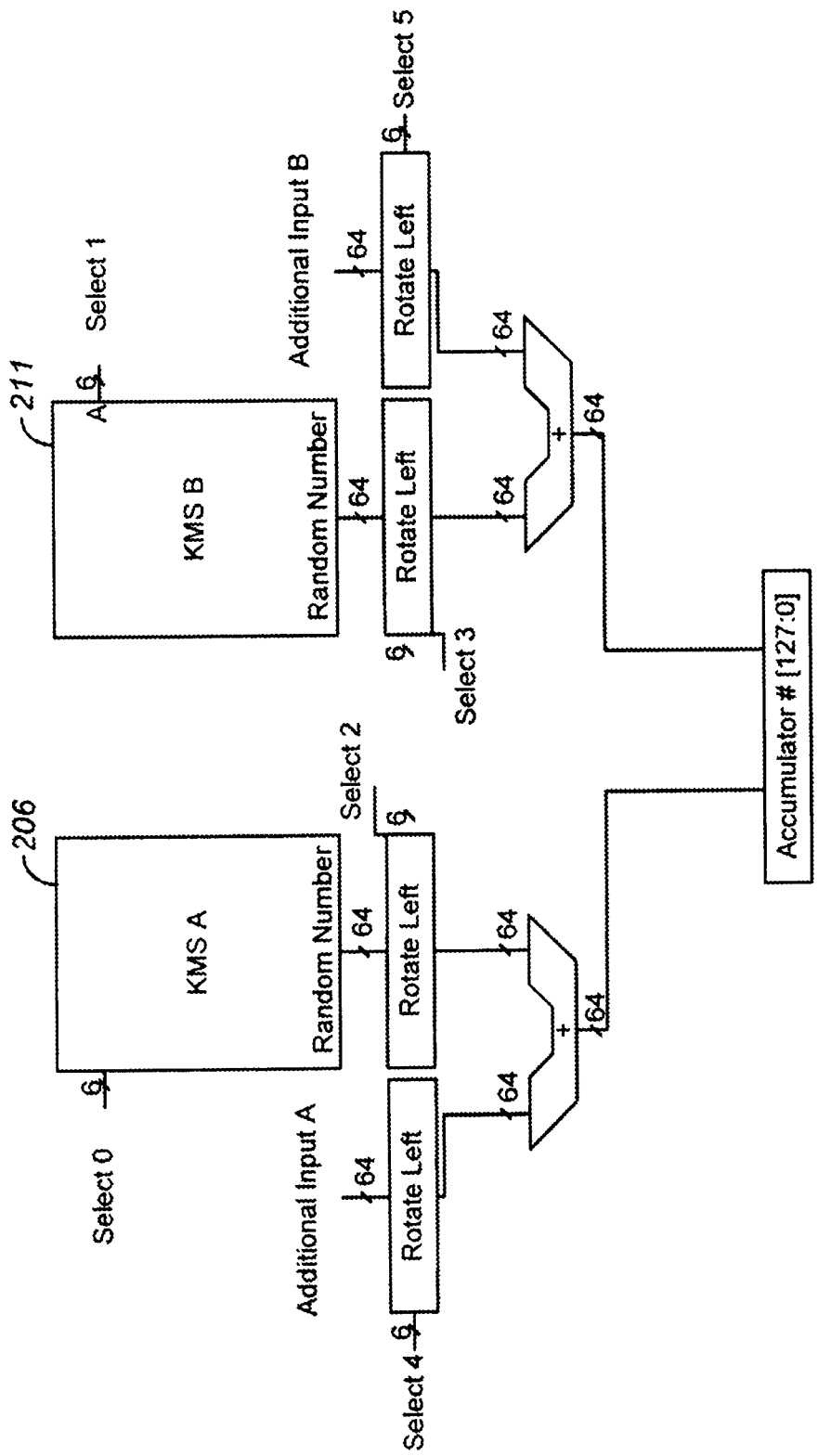
FIG. 5 is a block diagram of Accumulators 1-4.

FIG. 5 illustrates the logic for Accumulators 1, 2, 3 and 4. Each is created in the same manner as the others, but with different input signals. Similar to the manner of Accumulator 5, key material stores KMS A 206 and KMS B 211 are used, each storing 4K-bit random numbers. The "Select" bit fields shown in FIG. 5 (Select 0, Select 1, Select 2, Select 3, Select 4, and Select 5) each refer to a different portion (i.e. different subsets of bits) of the output value from Accumulator 5. For example, the field Select 0 which chooses the random number from KMS C 206 for Accumulator 1 may consist of bits [17:12], but for Accumulator 2, the field Select 0 may consist of bits [23:18], etc. Accumulators 3 and 4 use still other portions of the output value from Accumulator 5. The fields "Additional Input A" and "Additional Input B" introduce additional randomness. They can be chosen from the requested address, the security mode, the mask bits, the global write counter, or combinations of the foregoing, etc. For example, Additional Input A can be:

(Memory Address[*G*]+Mode[*A*]+Memory Address [*H*]+Mode[*B*])*XOR*(Address mask[*A*]+additional value)

where the letters in brackets "[ ]" represent subsets of the bit fields making up those values
The choice of different fields from different values introduces more randomness into the output values. Thus in the manner described, a 128-bit output value is provided for each of Accumulators 1-4.

Figure 6:
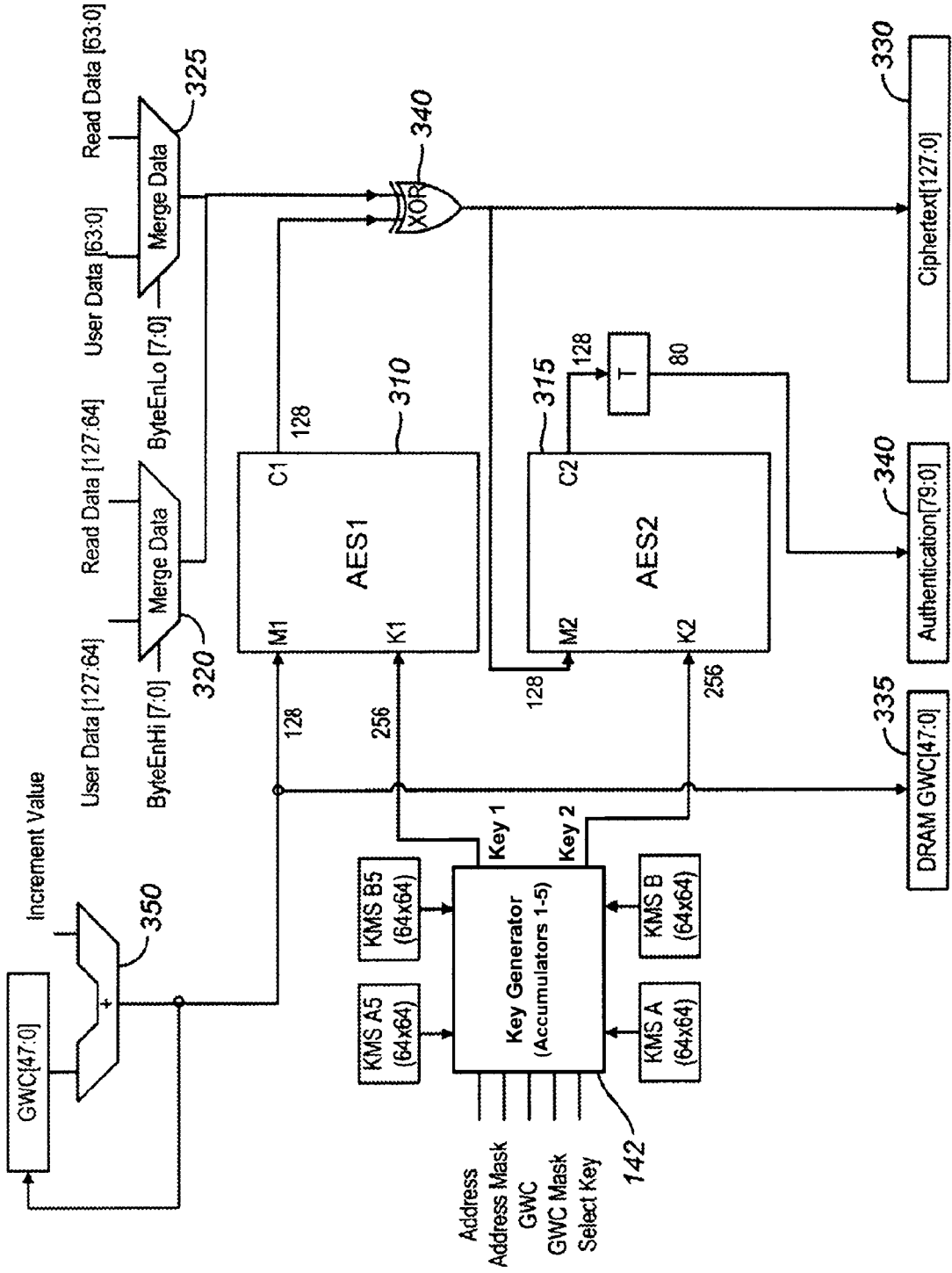
FIG. 6 is a block diagram of the encryption and authentication logic.

FIG. 6 is a diagram illustrating the encryption and authentication process. The SMTU takes 16-byte plaintext data blocks and converts them to 32-byte ciphertext data blocks. Each 32-byte block includes the ciphertext, an encrypted global write counter value, and a data authentication tag (DAT) (See also FIG. 3.) The keys generated by the operations described above are provided from the key generator 142 to each of the AES units 310 and 315 at inputs K1 and K2. (See also FIG. 2.) AES unit 310 performs the encryption operation using the global write counter value from adder 350 provided at input M1 and key material Key 1 provided at input K1. Similarly AES unit 315 performs the authentication operation using the data from XOR 340 provided at input M2 and key material Key 2 provided at input K2. The byte enable fields of the write request control merging of the data to be written ("user data") with the data read from the memory ("read data").

In the encryption operation, the global write counter value is copied (expanded) to generate a 128-bit value to be encrypted. With "∥" signifying concatenate, in formula format:

Ciphertext=*AES*(Key1,*GWC*∥*GWC*∥*GWC*[47:16])*XOR* Plaintext

This represents a stream cipher, that is an encryption mode where secret information (the stream) is merged with the plaintext with a bit-wise XOR operation. The resulting ciphertext is placed in register 330. The global write counter value used is placed in register 335. Of course, other expansion schemes of the short GWC value to the 128 cipher block length can also be used.
For authentication, also in formula format:

Authentication=*AES*(Key2,Ciphertext)[127:48]

This scheme computes the Authentication value in a truncated block cipher mode of AES. This value is provided by AES unit 315 using Key 2 and the ciphertext from XOR gate 340. The authentication value is an 80-bit value truncated by unit T from the 128-bit output value at terminal C2. It is placed in register 340. Of course, other reduction schemes from the 128 cipher block length to the desired length of the authentication tag could also be used.

Figure 7:
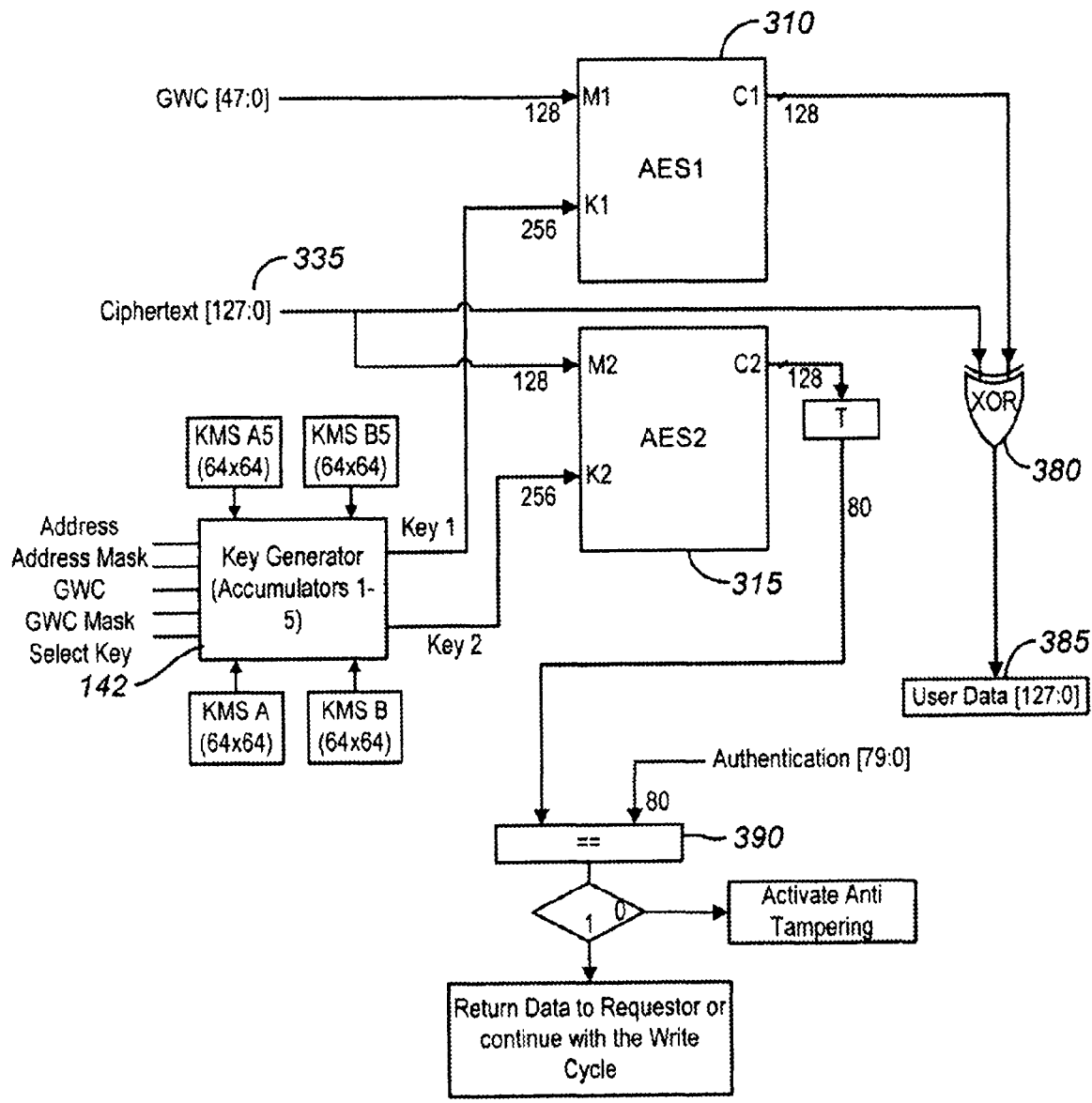
FIG. 7 is a block diagram of the decryption and authentication logic.

FIG. 7 is a diagram which illustrates the decryption process. For decryption the operations described above are reversed. The authentication, however, occurs in the same order because not all of the encryption result used for authentication is stored. In formula format:

Plaintext=*AES*(Key1,*GWC*[47:0]∥*GWC*[ 47:0]∥*GWC*[47:16])*XOR* Ciphertext
Authentication=*AES*(Key2,Ciphertext)[127:48]

As shown in FIG. 7, Key 1 is provided to AES unit 310 along with the global write counter value (GWC) 335 retrieved from the memory at the target location. After being processed, the GWC value is provided as one input to XOR gate 380. The ciphertext is provided to the other terminal, resulting in plaintext output 385. The ciphertext and Key 2 are provided to AES unit 315 to decrypt the authentication value. The stored authentication value and the decrypted value are compared at comparator 390. If they match, the decrypted data is returned to the requestor. If they do not match anti-tampering measures are activated, an error indicator is returned to the requestor, and the returned data is an arbitrary predetermined value, for example:

0x0BAD0BAD0BAD0BAD_
0BAD0BAD0BAD0BAD

Figure 8:
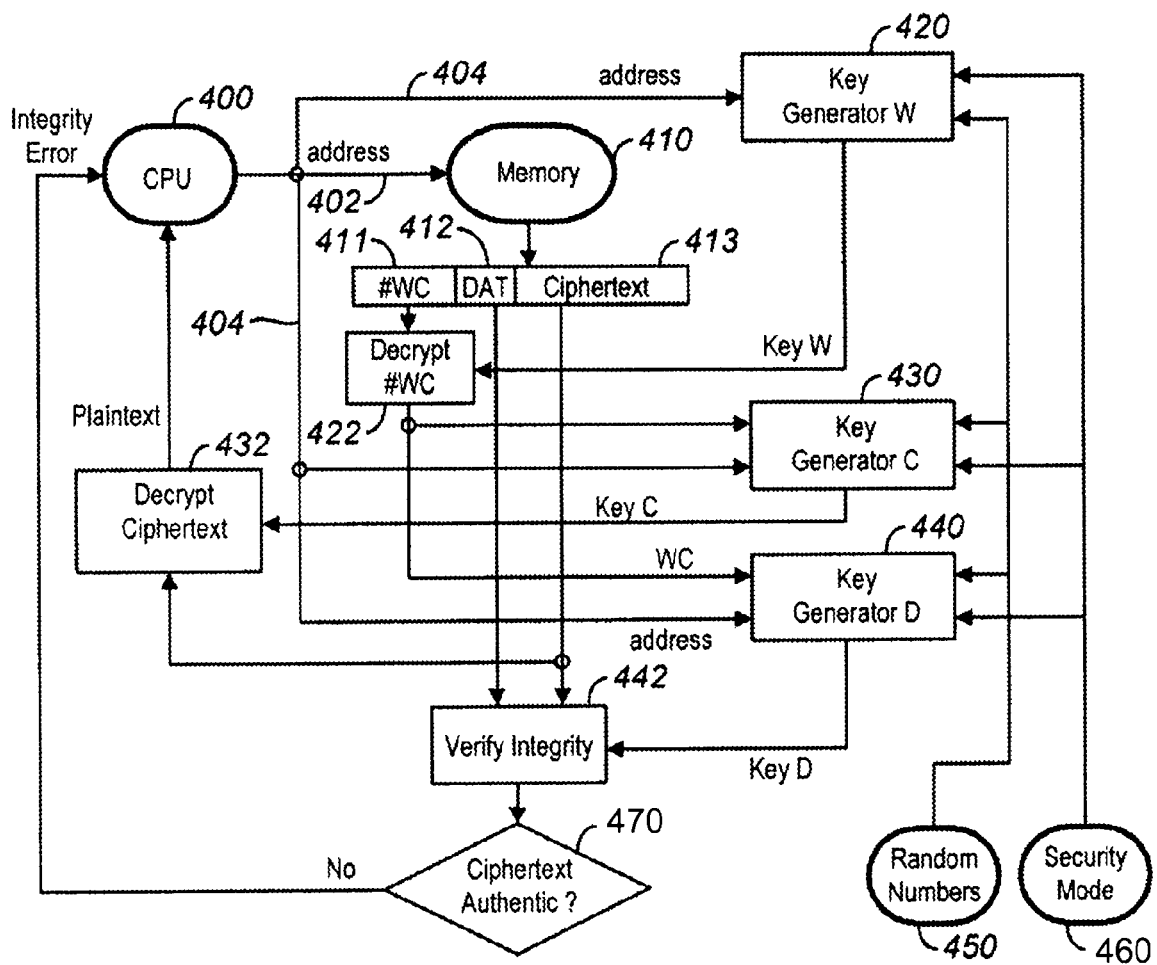
FIG. 8 is a diagram illustrating a read operation in the SMTU.
Figure 9:
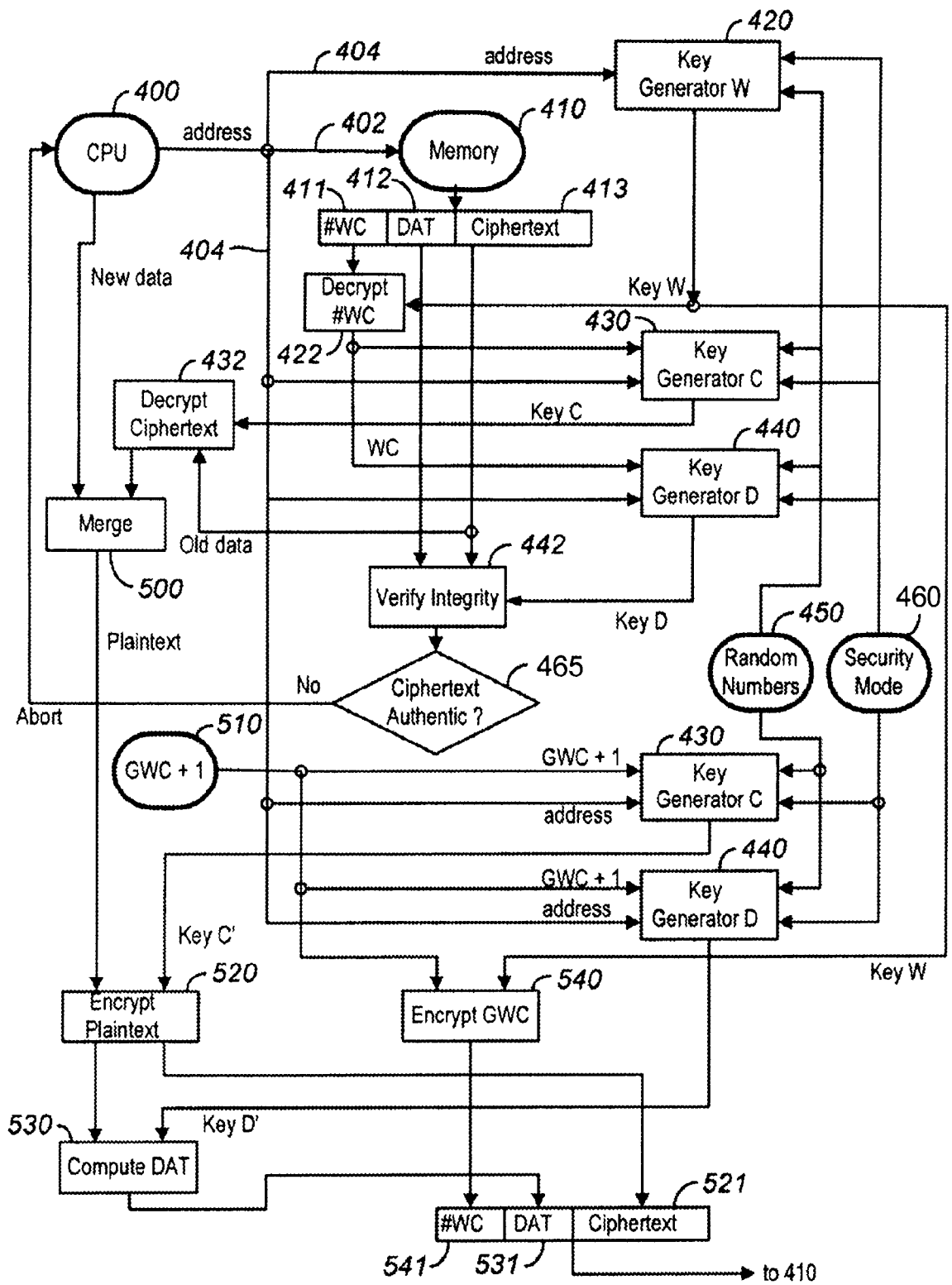
FIG. 9 is a diagram illustrating a write operation in the SMTU.

The general dataflow of the SMTU is described in conjunction with FIGS. 8 and 9. FIG. 8 illustrates the process for a read from memory, with FIG. 9 illustrating a write to memory.

For a read from memory (FIG. 8), the microprocessor (CPU) 400 generates a request for data at a memory address and provides that address to the memory 410 on bus 402. Of course, rather than receiving an address from the microprocessor, the address may be provided from some other system or component, e.g. a direct memory access controller. The received memory address is provided to the three key generators, key generator W 420, key generators C 430, and key generator D 440. Each of the three key generators 420, 430, and 440 also receives the random numbers 450 earlier stored or generated in the key material store memories, together with the security mode information 460. Stored at the memory address are the encrypted write counter value #WC 411, the data authentication tag (DAT) 412, and the block of ciphertext 413, and this information is provided to a register. Note that the encryption of the write counter can be very simple, and its key can be a predefined constant, without significant loss of security.

The write counter value 411 is decrypted 422 using key W. Key C is used to decrypt 430 the ciphertext 413, while key D is used to verify the integrity of the data authentication tag 412. Assuming that the integrity of the data is verified 442, the decrypted ciphertext, now plaintext, is returned to CPU 400. On the other hand, if the ciphertext authenticity is not verified at step 465, then an integrity error is provided to the CPU 400, and the plaintext it receives is flagged as erroneous.

The integrity of the stored data also is protected from accidental or malicious changes. Because random access memory data is accessed block-by-block, each individual block has a data authentication tag (DAT) attached. The DAT is the encrypted data (ciphertext) encrypted again under keys different from the ones used for ciphertext generation. In addition, this encryption, also depends on the #WC (nonce=Number used ONCE) and the memory address. The result is truncated to the length the security of the application dictates. For example, with an 80-bit DAT the probability that an alteration of a data block remains undetected is extremely small—on the order of $2^{-80} \approx 10^{-24}$.

As explained above, the encryption system here uses essentially random keys, the obscured encrypted write counter (#WC) as a nonce and the data authentication tag (DAT). The actual encryption is performed by using bit-wise exclusive-OR (FIG. 6, gates 340) with a value derived from the scrambled memory address, the GWC, the security mode, the mask bits and other data to the plaintext before storing it in the memory. The purpose of diversifying the encryption with the memory addresses is to hide from an adversary when the same or related data is stored at different memory locations, as well as to prevent copy-and-paste attacks.

FIG. 9 is a diagram which extends FIG. 8 by adding the logic for a write. As explained above, before a write operation, a read operation may be performed to verify that the data stored at the memory address is authentic. If prior read is performed, only if the read operation establishes the authenticity of the data, does a write operation occur. The upper portion of FIG. 9 is the same diagram as presented in FIG. 8.

As illustrated by FIG. 9, if data merging is performed, the new data to be written is merged 500 with the decrypted cipher text. The global write counter 510 is incremented and provided to each of key generators C 430' and D 440'. The blocks for these key generators are repeated in the lower portion of the figure just for convenience; in their physical implementation they can be the same as generators 430 and 440, but operating on different input. Using the incremented write counter value and the address information provided on bus 404, new keys C' and D' are generated and provided to appropriate logic. Key C' is used to encrypt 520 the plaintext from the merge 500. Key D' is used to compute the new data authentication tag 530. The combination of key W and the incremented global write counter value is used to provide an encrypted 540 write counter value. The resulting values of the ciphertext 521, the data authentication tag 531, and the write counter value 541 can then be returned and written to memory 410.

In summary, a read data operation is performed as follows:
1. Translate the logical address into the memory physical address.
2. Read 32 bytes of the encrypted data from the memory at the specified address.
3. Generate the decryption and authentication keys. Use the memory address, the write counter, the security mode and the random number for the key generation, causing each resulting key to be unique to each memory location and write counter value, with very high probability.
4. Use the keys generated in step 3 together with the authentication fields of the data to decrypt the ciphertext and to authenticate it. If the authentication fails, activate anti-tamper mechanisms, otherwise continue on to step 5.
5. If the current cycle is a read request then send the decrypted plaintext to the requestor. If it is a write request proceed to the steps below.

Also, in summary, a write data operation is performed (optionally preceded by a read operation from the same memory location as described immediately above), as follows:
1. Merge the data to be written with the data read from the memory. The data read from memory was previously decrypted and authenticated during the read operation as per the preceding paragraph.
2. Increment the write counter.
3. Encrypt the merged write data using a new encryption key, which is different from the key that was used in reading the data for the decryption, because the updated write counter is included in its generation.
4. Generate the data authentication tag using the newly encrypted write data and a new authentication key (based on the memory address, together with the updated write counter value. The security mode and the random number are used to diversify the keys.
5. Write the data back to memory.

The preceding description of the preferred embodiment of our secure memory transaction unit has been described with many specific details, for example, groups and numbers of address bits being supplied to particular inputs of various circuits. It will be appreciated that these details are provided to illustrate the invention, but that the scope of the invention is defined by the appended claims.

What is claimed is:
1. A method for providing security for plaintext data in a computer system comprising:
using a stream cipher encrypting the plaintext data to thereby create ciphertext before storing the ciphertext in an addressable memory at memory locations therein; and wherein:
the encryption uses statistically different keys for every memory location; and the encryption uses statistically different keys for every write operation; and the keys are recreated for decrypting data upon retrieving the data from the addressable memory.

2. A method as in claim 1 wherein each of the memory locations stores version information, a data authentication tag, and a block of the ciphertext; wherein the ciphertext block is produced with a first key and the authentication tag is produced with a second key; wherein the first and second keys are changed before each write operation at a memory location; and wherein the first and second keys are changed from memo location to memory location.

3. A method as in claim 2 wherein decrypting a ciphertext block at a memory location includes:
retrieving the ciphertext block, the version information, and the data authentication tag stored at a first address;
using a random number, the first address and the version information to recreate the first key and the second key;
using the recreated first key to decrypt the ciphertext block.

4. A method as in claim 3 wherein:
the recreated second key is used on the data authentication tag to provide a data integrity value; and
if the data integrity value indicates the plaintext data are valid, (1) new plaintext data is merged with the decrypted ciphertext block to form a new ciphertext block, and then the new ciphertext block is written to the first address; and (2) a new version information and a new data authentication tag are written to the first address.

5. A method as in claim 4 wherein the version information comprises a value indicative of a number of write operations made to at least a portion of the memory.

6. A method as in claim 5 wherein the version information comprises a value indicative of the number of write operations made to the at least the portion of the memory, and to which is added another number.

7. A method as in claim 4 wherein if the data integrity value indicates the plaintext data are not valid, then the computer system takes an action based upon a previously set user defined security policy.

8. A method as in claim 1 wherein each of the memory locations stores version information, a data authentication tag, and the ciphertext corresponding to the plaintext; and wherein using a random number, the first address and the version information further comprises:
storing a first set of random numbers in a first memory separate from the addressable memory;
using a subfield of the first address to select one random number from the first set of random numbers;
rotating the selected one random number using another subfield of the first address to thereby create a rotated random number; and
providing at least a portion of the rotated random number to an encryption processor to encrypt the plaintext data.

9. A method as in claim 8 wherein the method further comprises:
storing a second set of random numbers in a second memory;
using a subfield of the first address to select one random number from the second set of random numbers;

rotating the selected one random number from the second set of random numbers using another subfield of the first address to thereby create a second rotated random number; and providing at least a portion of the second rotated random number to an encryption processor to encrypt the plaintext data.

10. A method for providing security for plaintext data being transferred within a computer system having a memory, the method comprising:

encrypting plaintext data and creating a data authentication tag using statistically different keys for every memory location and statistically different keys for every write operation;

storing the encrypted plaintext data, version information and the data authentication tag at each of the memory locations; and upon later retrieving the encrypted plaintext data, the version information and the data authentication tag, using the authentication tag to authenticate the encrypted data.

11. A method as in claim 10 wherein the version information relies upon at least a write counter and an increment value.

12. A method for providing security for data being transferred between units in a computer system comprising:

receiving an address from a requesting unit for information to be read from the address in a memory;

generating an encryption key using at least the address and a random number;

reading the data stored at the address; using the encryption key and the data, decrypting the data and authenticating it; and wherein:

if the authenticating step fails, activating an anti-tamper mechanism; and if the authenticating step is successful sending decrypted data to the requesting unit.

13. A method as in claim 12 wherein the step of generating the encryption key further comprises generating an encryption key using at least the address and a random number to create an encryption key which is statistically different for each address in the memory.

14. In a computing system a method of encrypting data wherein:

for every address in memory a statistically different encryption key is used;

for subsequent writes to a given address an encryption key based on a global write counter value is used to provide a statistically different key than in previous writes to that address; and wherein an obscuring value is added to the write counter value with each use.

15. Apparatus for providing security for storing and retrieving data comprising:

a memory having a set of addressable locations, each of the addressable locations having an address; and a processor coupled to the memory for reading data from the memory and writing data to the memory, the processor being programmed to store, at the addressable locations in the memory (i) encrypted data, (ii) version information and (iii) an authentication value, wherein a statistically unique encryption key and a statistically unique authentication key are used for each addressable location in the memory each time that addressable location is accessed.

16. Apparatus as in claim 15 wherein the processor when reading data from the memory performs steps of: retrieving the encrypted data, the version information and the authentication value stored at one of the addresses; decrypting the encrypted data to thereby obtain decrypted data; and checking the authentication value to determine if the decrypted data are valid.

17. Apparatus as in claim 16 further comprising if the decrypted data are valid, then writing new data to the address from which the encrypted data was retrieved using a new encryption key for the encryption of the data, the new encryption key being based at least on the address, updated version information, and a number of writes made.

18. The method of claim 1, wherein statistically different encryption and authentication keys are used for each write operation at a memory location; and wherein the encryption and authentication keys are both changed as a function of memory location address.

19. The method of claim 18, wherein for each write operation of data at a memory location, an encryption key is used to encrypt the data to produce encrypted data, and an authentication key is used to encrypt at least some of the encrypted data to produce an authentication tag; and wherein the encrypted data and the authentication tag are stored at the memory location.

20. The method of claim 18, wherein each key for a write operation at a memory location is generated as a function of a version number corresponding to the memory location, wherein the version number corresponds to a number of write operations at the memory location and is stored with the encrypted data and the authentication tag.

21. The method of claim 18, wherein each key for a write operation at a memory location is generated as a function of the memory location address, a random number, and a global write counter, which is incremented before the write operation is performed.

22. The method of claim 21, wherein the generation of each key is also a function of an operational security mode.

23. The method of claim 18, wherein for each write operation at a memory location, a ciphertext block and authentication tag are read; the ciphertext block is decrypted if the tag indicates that tampering has not occurred; the data is merged with the decrypted block to produce a new data block; the new data block is encrypted with the encryption key to produce a new ciphertext block; and a new authentication tag is produced with the authentication key and at least some of the new ciphertext block; and the new ciphertext block and the new authentication tag are stored at the memory location.

* * * * *